(12) United States Patent
Gulvin et al.

(10) Patent No.: US 8,210,690 B2
(45) Date of Patent: *Jul. 3, 2012

(54) METHOD OF PROJECTING IMAGE WITH TUNABLE INDIVIDUALLY-ADDRESSABLE FABRY-PEROT FILTERS

(75) Inventors: Peter M. Gulvin, Webster, NY (US);
Lalit K. Mestha, Fairport, NY (US);
Yao Rong Wang, Webster, NY (US);
Pinyen Lin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 332 days.

This patent is subject to a terminal disclaimer.

(21) Appl. No.: 12/568,074

(22) Filed: Sep. 28, 2009

(65) Prior Publication Data

US 2010/0007939 A1      Jan. 14, 2010

Related U.S. Application Data

(62) Division of application No. 11/405,941, filed on Apr. 18, 2006, now Pat. No. 7,628,493.

(51) Int. Cl.
*G03B 21/14*     (2006.01)
*G03B 21/60*     (2006.01)
*G02B 5/22*      (2006.01)
*G01J 3/45*      (2006.01)
*G01B 9/02*      (2006.01)

(52) U.S. Cl. .............. 353/84; 353/20; 353/32; 359/455; 359/891; 356/454; 356/519

(58) Field of Classification Search .................... 353/84, 353/20, 32; 359/455, 498, 502, 891; 356/454, 356/519
See application file for complete search history.

(56) References Cited

U.S. PATENT DOCUMENTS

| 4,859,060 A | 8/1989 | Katagiri et al. |
| 5,550,373 A | 8/1996 | Cole et al. |

(Continued)

FOREIGN PATENT DOCUMENTS

EP          1 564 710        8/2005

(Continued)

OTHER PUBLICATIONS

Miles, M.W. "A MEMS Based Inteferometric Modulator (IMOD) for Display Applications," Proceedings Sensors Expo, Detroit, Oct. 21-23, 1997.

(Continued)

*Primary Examiner* — Georgia Y Epps
*Assistant Examiner* — Magda Cruz
(74) *Attorney, Agent, or Firm* — Fay Sharpe LLP (57) ABSTRACT

A projection system includes a display apparatus comprising a plurality of tunable Fabry-Perot filters, each of the filters being configured for shifting between a state in which the filter transmits radiation in a bandwidth in the visible range of the electromagnetic spectrum and a state in which the filter transmits radiation in a bandwidth outside the visible range of the electromagnetic spectrum. An illuminator provides light to the plurality of Fabry-Perot filters. A control system receives image data and controls the display apparatus to project an image onto an associated display surface. The control system includes a modulator which provides wavelength modulation signals to the plurality of Fabry-Perot filters to modulate a color of pixels in the image and causes selected ones of the Fabry-Perot filters to shift into the bandwidth outside the visible range to modulate the brightness of pixels in the image.

15 Claims, 7 Drawing Sheets

U.S. PATENT DOCUMENTS

| | | |
|---|---|---|
| 6,295,130 B1 | 9/2001 | Sun et al. |
| 6,384,953 B1 | 5/2002 | Russell et al. |
| 6,674,562 B1 | 1/2004 | Miles |
| 6,853,476 B2 | 2/2005 | Martin et al. |
| 6,975,949 B2 | 12/2005 | Mestha et al. |
| 6,980,346 B1 | 12/2005 | Greer et al. |
| 7,304,801 B2 | 12/2007 | Wang et al. |
| 7,333,208 B2 | 2/2008 | Mestha et al. |
| 7,355,714 B2 | 4/2008 | Wang et al. |
| 7,370,185 B2 | 5/2008 | Piehl et al. |
| 7,372,613 B2 | 5/2008 | Chui et al. |
| 7,383,261 B2 | 6/2008 | Mestha et al. |
| 7,385,704 B2 | 6/2008 | Mestha et al. |
| 7,417,746 B2 | 8/2008 | Lin et al. |
| 7,436,401 B2 * | 10/2008 | Szepesi et al. ............... 345/212 |
| 7,463,421 B2 | 12/2008 | Miles |
| 7,486,429 B2 | 2/2009 | Chui |
| 7,561,133 B2 | 7/2009 | Mestha et al. |
| 7,628,493 B2 * | 12/2009 | Gulvin et al. ............... 353/84 |
| 2005/0068627 A1 | 3/2005 | Nakamura et al. |
| 2005/0195370 A1 | 9/2005 | Gore |
| 2005/0226553 A1 | 10/2005 | Hugon et al. |
| 2006/0028708 A1 | 2/2006 | Miles |
| 2006/0066938 A1 | 3/2006 | Chui |
| 2007/0242358 A1 | 10/2007 | Lin et al. |
| 2007/0242920 A1 | 10/2007 | Lin et al. |

FOREIGN PATENT DOCUMENTS

| | | |
|---|---|---|
| EP | 1 640 763 | 3/2006 |
| JP | 1-102415 | 4/1989 |
| WO | WO 02/069259 | 9/2002 |

OTHER PUBLICATIONS

Correia, et al., High-Selectivity Single-Chip Spectrometer in Silicon for Operation at Visible Part of the Spectrum, *IEEE Transactions on Electron Devices*, vol. 47, No. 3. Mar. 2000.

Correia, et al., MEMS: A New Joker in Microinstrumentation, *IEEE Industrial Electronics Society Newsletter*, New Technology Article, Jan. 2000.

Dohi, et al., The Optical Blood Test Device with the Micro Fabry-Perrot Interferometer, 17th *IEEE Intl. Conf. on MEMS*, 2004.

Friese, et al., Polymer-Based Membrane Mirrors for Micro-Optical Sensors, *IEEE* 0-7803-8133-5/03, pp. 667-672, 2003.

Mott, et al., Micromachined Tunable Fabry-Perot Filters for Infrared Astronomy, *Proc. SPIE The Intl. Society for Optical Engineering*, 1999.

\* cited by examiner

METHOD OF PROJECTING IMAGE WITH TUNABLE INDIVIDUALLY-ADDRESSABLE FABRY-PEROT FILTERS

This is a divisional application of U.S. application Ser. No. 11/405,941, filed Apr. 18, 2006, entitled PROJECTOR BASED ON TUNABLE INDIVIDUALLY-ADDRESSABLE FABRY-PEROT FILTER, by Gulvin, et al., the disclosure of which is incorporated herein in its entirety by reference.

CROSS REFERENCE TO RELATED APPLICATIONS

Cross-reference is made to the following co-pending, commonly assigned applications, which are incorporated in their entireties, by reference:

U.S. application Ser. No. 11/092,635, filed Mar. 30, 2005, entitled "TWO-DIMENSIONAL SPECTRAL CAMERAS AND METHODS FOR CAPTURING SPECTRAL INFORMATION USING TWO-DIMENSIONAL SPECTRAL CAMERAS," by Mestha et al.;

U.S. application Ser. No. 11/319,395, filed Dec. 29, 2005, entitled "SYSTEMS AND METHODS OF DEVICE INDEPENDENT DISPLAY USING TUNABLE INDIVIDUALLY-ADDRESSABLE FABRY-PEROT MEMBRANES," by Mestha et al.;

U.S. application Ser. No. 11/319,389, filed Dec. 29, 2005, entitled "RECONFIGURABLE MEMS FABRY-PEROT TUNABLE MATRIX FILTER SYSTEMS AND METHODS," by Wang, et al.;

U.S. application Ser. No. 11/319,276 filed Dec. 29, 2005, entitled "FABRY-PEROT TUNABLE FILTER SYSTEMS AND METHODS," by Lin, et al;

U.S. application Ser. No. 11/016,952 filed Dec. 20, 2004, entitled "FULL WIDTH ARRAY MECHANICALLY TUNABLE SPECTROPHOTOMETER," by Mestha, et al;

U.S. application Ser. No. 11/092,835, filed Mar. 30, 2005, entitled "DISTRIBUTED BRAGG REFLECTOR SYSTEMS AND METHODS," by Wang, et al.;

U.S. application Ser. No. 10/833,231, filed Apr. 27, 2004, entitled "FULL WIDTH ARRAY SCANNING SPECTROPHOTOMETER," by Mestha, et al.; and, U.S. application Ser. No. 10/758,096, filed Jan. 16, 2004, entitled "REFERENCE DATABASE AND METHOD FOR DETERMINING SPECTRA USING MEASUREMENTS FROM AN LED COLOR SENSOR, AND METHOD OF PARTITIONING A REFERENCE DATABASE," by Mestha, et al.

U.S. application Ser. No. 11/406,030, filed Apr. 18, 2006, entitled "FABRY-PEROT TUNABLE FILTER," by Lin et al.

BACKGROUND

The exemplary embodiment relates to micro-electromechanical systems. It finds particular application in connection with a projection device comprising an array of independently addressable Fabry-Perot membranes and will be described with particular reference thereto.

Flat panel displays, such as liquid crystal displays (LCD) are widely used in a variety of applications, including watches, cell phones, and television displays. These displays rely on the combination of light of three primary colors to achieve a range of colors. The range and intensities of the colors which can be achieved with LCDs are often limited. The challenge is still in displaying rich chromatic colors at high resolution and at low power consumption.

Projection systems have the advantage that they are unobtrusive when turned off, since they can be smaller than a paperback book and can be mounted out of the way, on a ceiling or wall. Their size also makes them very portable. LCD and micro-electromechanical (MEMS)-based projectors are commonly used for business and home theater projection systems. In an LCD projector, light is sent through a layer of liquid crystals that either block or pass light by changing their polarization in response to an applied voltage. The color comes from red, green, or blue color filters placed in a grid that correspond to each of the three subpixels that make up a full pixel. MEMS-based projectors typically use an array of mirrors to reflect light onto the screen or shunt it away, with the color coming from a spinning color wheel that the light passes through, using the timing of the mirror movements to determine how much of each color will be shown on the screen. To create high definition images, a large number of mirrors are required to be individually operable, typically of the order of about a half to one million mirrors. The use of the color wheel limits the saturation of any one color, since its maximum duty cycle can only be 33% (assuming three colors). The color gamut of these two methods is limited to colors inside the triangle in the chromaticity diagram defined by the three filters. Thus the projectors cannot display colors of higher chroma than that of their filters, which excludes about half of the colors that the human eye can see. Additionally, since both systems require combinations of RGB (geographically separated or rapidly cycled in time) to create different colors within the visible range, the range of colors is limited.

INCORPORATION BY REFERENCE

The following references, the disclosures of which are incorporated by reference, are mentioned:

U.S. Pat. No. 6,295,130 to Sun, et al., issued Sep. 25, 2001, discloses a Fabry-Perot cavity spectrophotometer.

U.S. Pat. No. 6,980,346 to Greer, et al. discloses a display device which employs a Fabry-Perot filter having a tunable optical property.

US Published Application No. 20050226553, published Oct. 13, 2005, entitled "OPTICAL FILTRATION DEVICE," by Hugon, et al., discloses wavelength selective optical components for transmitting light in a narrow spectral band, which is centered around a wavelength, and for reflecting the wavelengths lying outside this band. The component includes an input guide conducting light radiation to a tunable filter, and means for returning a first part of the radiation reflected by the filter during the first pass in order to perform a second pass through it.

BRIEF DESCRIPTION

Aspects of the exemplary embodiment relate to a projection system and to a method.

In one aspect, the projection system includes a display apparatus comprising a plurality of tunable Fabry-Perot filters, each of the filters being configured for shifting between a state in which the filter transmits radiation in a bandwidth in the visible range of the electromagnetic spectrum and a state in which the filter transmits radiation in a bandwidth outside the visible range of the electromagnetic spectrum. An illuminator provides light to the plurality of Fabry-Perot filters. A control system receives image data and controls the display apparatus to project an image onto an associated display surface. The control system includes a modulator which provides wavelength modulation signals to the plurality of Fabry-Perot filters to modulate a color of pixels in the image and causes selected ones of the Fabry-Perot filters to shift into the bandwidth outside the visible range to modulate the brightness of pixels in the image.

In another aspect, a method of projecting an image includes receiving image data for an image to be projected and illuminating a plurality of tunable Fabry-Perot filters. Each of the filters is configured for shifting between a state in which the filter transmits radiation in a bandwidth in the visible range of the electromagnetic spectrum and a state in which the filter transmits radiation in a bandwidth outside the visible range of the electromagnetic spectrum. The method further includes controlling the tunable Fabry-Perot filters to project the image onto an associated display surface including providing wavelength modulation signals to the plurality of Fabry-Perot filters to modulate a color of pixels in the image and causing selected ones of the Fabry-Perot filters to shift into the bandwidth outside the visible range to modulate the brightness of pixels in the image in accordance with the image data.

In another aspect, a projection system includes an image source which supplies image data for an image to be projected and an array of individually tunable Fabry-Perot filters mounted on a common transparent substrate, each of the filters being configured for transmitting visible light therethrough. An illuminator provides light to the plurality of Fabry-Perot filters. A control system receives image data and controls the display apparatus to project an image onto an associated display surface. The control system includes a modulator which provides wavelength modulation signals to the plurality of Fabry-Perot filters to modulate a color of pixels in the image. A lens system includes an array of microlenses intermediate the array of filters and the associated display surface.

DETAILED DESCRIPTION

The exemplary embodiment relates to a display system and in particular to a projection display system, such as a television projection system, and to a method of displaying electronically stored information.

The display system may include a Fabry-Perot array and an illuminator. Each cavity of the array may be tuned to transmit colors of color-separated incoming image pixels. For each color-separated image pixel, multiple gray (brightness) levels may be achieved through time-division multiplexing of the transmitted light. In various exemplary systems and methods, the display system may be a two-dimensional flat panel matrix display system, with each individual pixel of the image having a color corresponding to the size of a respective cavity, with gray levels achieved using the time-division multiplexing of the cavity. In other embodiments, image pixels may be generated by the combination of outputs of a plurality of the cavities transmitting at the same wavelength band or at different wavelength bands. The size and time-division multiplexing of the cavities provide a device-independent display of the image with rich chromatic colors.

The exemplary embodiment includes a densely-packed, individually-addressable 2-dimensional array of Fabry-Perot cells (filters) with cavities which provide tunable gaps actuated by application of a voltage. As the gap changes, the reflections off the upper and lower surfaces of the Fabry-Perot cavity interfere, and the resulting wavelength of the transmitted light is that which produces constructive interference. The ability to change the filter wavelength band with time enables the filter to achieve a wider range of wavelengths than can be achieved with other projection and flat panel systems. The range of colors is dependent on the resolution of the Fabry-Perot filter, which may be from about 5 to 100 nm, e.g., less than 50 nm, and in one embodiment, about 10 nm. Each filter may thus have about thirty-one states in the visible region (about 400-700 nm) corresponding to thirty one wavelength bands with a peak wavelength in each band. In one embodiment, colors may be created by combining the outputs of two or more Fabry-Perot filters such that two or three wavelength bands are mixed together. For example, by combining three filters, each with offset wavelength peaks, a wide range of colors can be rendered. In one embodiment, some of the colors may be created by rapidly shifting the filter between two (or more) states at sufficient speed that the two colors are indistinguishable to the eye and are viewed as a single combined color.

Figure 1:
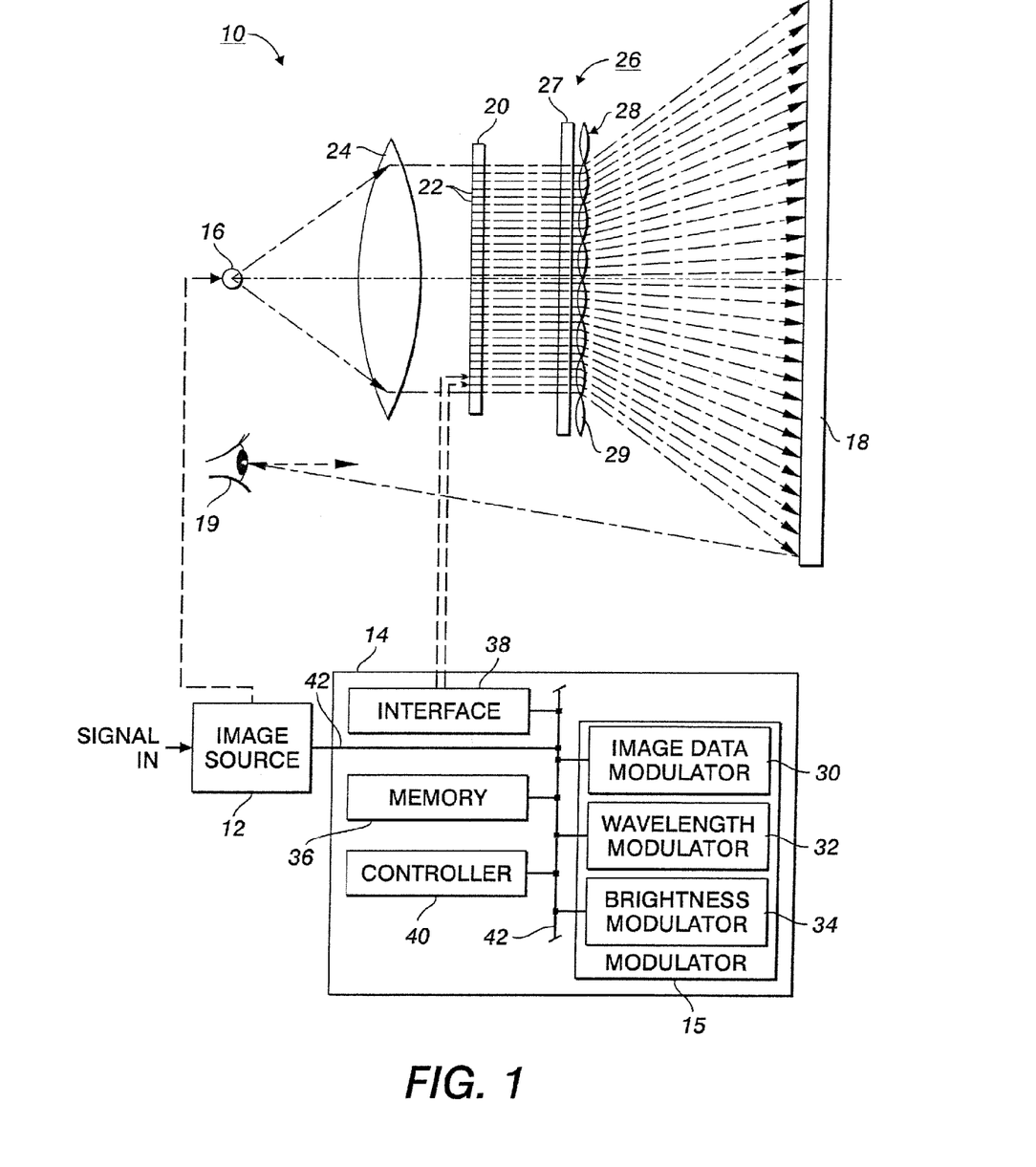
FIG. 1 is a schematic view of a projection system according to the exemplary embodiment.

With reference to FIG. 1, an exemplary projection system includes a display apparatus 10, an image source 12, a control system 14 which comprises a modulator 15, an illuminator 16, such as a light source, and a display surface 18.

The display surface 18 can be a screen, such as a movie screen placed on a wall, or a screen forming a portion of a rear-projection television set, a wall or other surface from which the image can be viewed at a distance by a viewer's eye 19. In one embodiment, the display surface is a reflective surface, i.e., it reflects more light than it transmits. The display surface may be remote from the display apparatus 10, such that the image emitted by the display is enlarged multiple times before reaching the display surface, such as at least 5 times, and in some embodiments at least ten times or at least 50 times.

The display apparatus 10 includes a two-dimensional array 20 of tunable Fabry-Perot filters 22 which may be addressable individually or addressable as small groups of Fabry-Perot filters. Light from the source is focused on the display apparatus by a first optical system 24, such as a converging lens, which may generate a collimated beam of light for illuminating the array. A second optical system 26, intermediate the array and the display surface 18, may include one or more projection lenses. In the illustrated embodiment, the second optical system 26 comprises a projection (diverging) lens 27 which includes and a converging lens 28 spaced therefrom, both of which comprise a plurality of adjoining microlenses 29.

The image source 12 may be any suitable source of digital images, such as color images, and can include, for example, one or more of a digital video disk (DVD) player, a wireless television tuner (e.g., receiving local or satellite signals), a cable television tuner (e.g., making use of electrical or optical signal reception), and a wireless computing device (e.g., a laptop computer, a personal digital assistant (PDA), and a tablet computer), among others.

The light source 16 may comprise one or more white light sources, such as one or more of halogen lamps, fluorescent lamps, high intensity LEDs, and other high intensity sources capable of generating light in wavelengths throughout the visible range of the spectrum when energized. The range of colors which can be achieved is dependent, to some degree, on the light source, since if the source has gaps in its spectrum, the projector will not be able to display that wavelength, regardless of the filter's characteristics. If the strength of the illumination varies over the spectrum (as does sunlight), this could be accommodated by altering the amount of time that the filter dwells in each state, spending longer at the colors that have less representation in the illumination.

The microlenses 29 of the second focusing device 26 may be created using a mold. Alternatively, a polymer, e.g., an epoxy resin, such as SU8 (a photo-imagable epoxy based on a fully epoxidized, bisphenol-A/formaldehyde novolac copolymer, available from Shell Chemical) could be patterned and then reflowed to create the desired shape. Or, a self focusing (SELFOC) lens array could be used. Such lenses are available, for example, from NSG America. Inc., Somerset N.J. 08873.

The basic structure of each Fabry-Perot cavity or filter 22 comprising the array 20 may be as described, for example, in U.S. Pat. No. 6,295,130, and co-pending application Ser. No. 11/092,635, which are incorporated herein by reference in their entireties. In general, the Fabry-Perot filter includes two micro-mirrors separated by a gap. The gap may be an air gap, or may be filled with liquid or other material. The micro-mirrors may be defined by membranes which are primarily silicon (thin enough to avoid absorbing much light) or silicon nitride and are optionally coated with multi-layered distributed Bragg Reflector (DBR) stacks or highly reflective metallic layers, such as gold. A voltage applied between the two mirrors may be adjusted to change the distance between the two mirrors. The space between the two mirrors is also referred to as the size of the gap. Only incident light with a certain wavelength band may be able to pass the gap due to an interference effect which is created inside the gap due to multiple reflections. Depending on the gap distance, it is possible to block the visible light completely or transmit close to the maximum. Any heat dissipation resulting from blockage of all the light may be removed from the device using fans or other air circulating systems.

The control system 14 addresses the Fabry-Perot filters individually or in small clusters to achieve a selected wavelength band of each pixel in the image and a selected gray level or intensity. The illustrated control system includes a modulator 15 comprising an image data modulator 30, a wavelength modulator 32, and a brightness modulator 34 which may be individual components or combined into a single modulation component. In addition to the modulator 15, the control system 14 may further include a memory 36, an interface device 38, and a controller 40, all interconnected by a connection or data bus 42, and as will be described in greater detail below.

Figure 2:
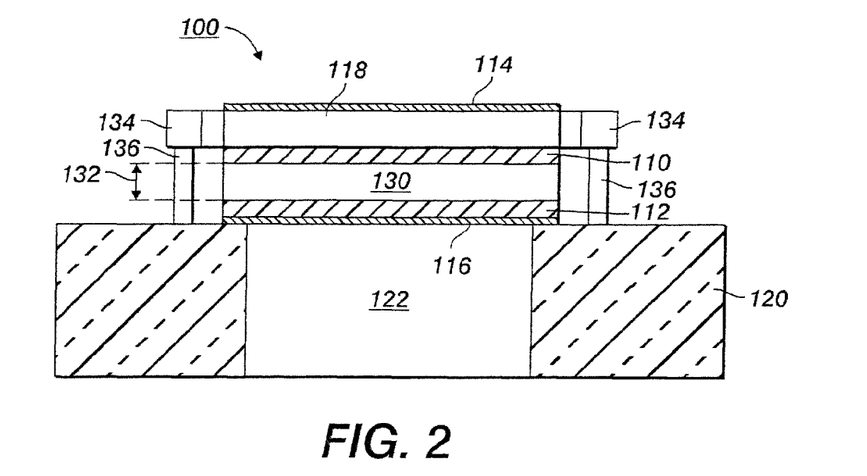
FIG. 2 is a side sectional view of an exemplary Fabry-Perot filter according to a first exemplary embodiment.
Figure 3:
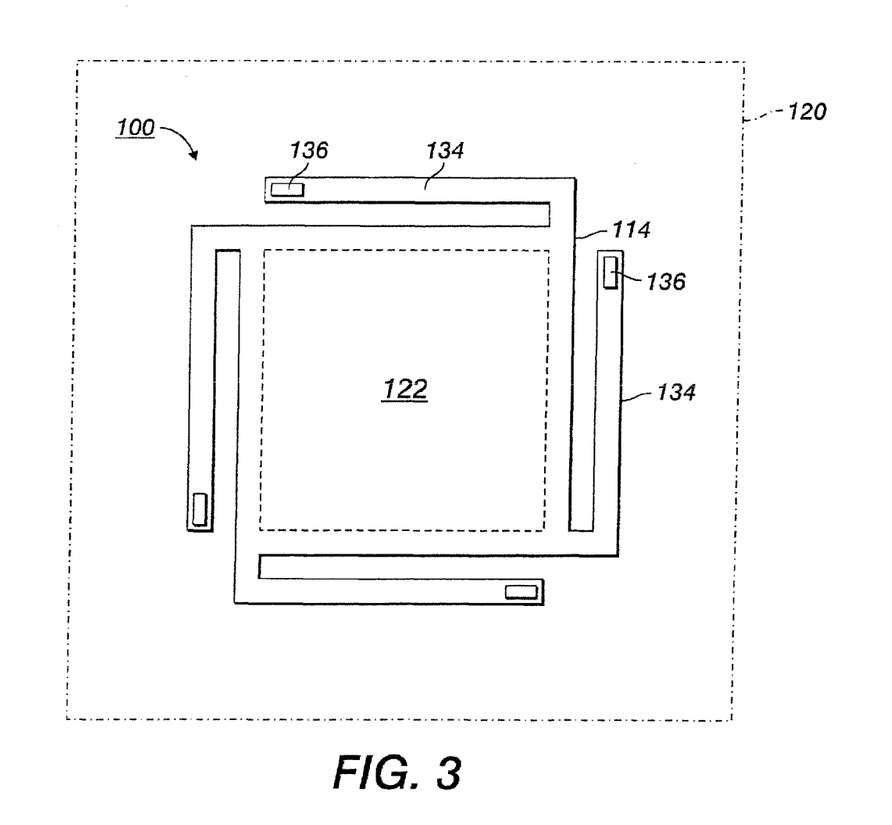
FIG. 3 is a top plan view of the exemplary Fabry-Perot filter.

For example, FIG. 2 shows a side view of a portion of the array 20 which includes one embodiment of a micro-electromechanically tunable device having a Fabry-Perot (F-P) micro-electro-mechanically tunable Fabry-Perot filter 100 which will be referred to herein as an interferometer or Fabry-Perot filter. FIG. 3 is a top view of the Fabry-Perot filter 100. As shown in FIG. 2, the Fabry-Perot filter 100 may include a first mirror 110 and a second mirror 112. In various exemplary embodiments, the second mirror 112 may include a distributed Bragg reflector (DBR) mirror that includes three pairs of quarter wavelength Si/SiN$_x$ stacks. The first mirror 110 may include a distributed Bragg reflector (DBR) mirror that includes two pairs of quarter wavelength Si/SiN$_x$ stacks. SiN$_x$ may be Si$_3$N$_4$. In another embodiment, one or both of the mirrors may be primarily Si. The addition of the DBR leads to a sharper spectral spike at the desired wavelength, increasing the spectral resolution.

In general, a driving method of a wavelength tunable optical filter can largely be classified into two categories. One is to adjust a distance between mirrors by a force applied to the mirrors and to provide a restoration force by a structure connected to the mirror as in an electrostatic scheme and the other is by a deformation of the driving body that is connected to the mirror as in a thermal expansion scheme, an electromagnetic scheme, or an external mechanical force scheme.

As shown in FIG. 2, the Fabry-Perot filter 100 may also include first and second electrodes 114, 116. The first electrode 114 may be formed on the first mirror 110 via a support element 118. The second electrode 116 may be sandwiched between the second mirror 112 and a substrate 120.

The substrate 120 may have a portion 122 that may be a hole or a transparent part. The support element 118 and first and second electrodes 114,116 may be transparent. Indium tin oxide (ITO) may be used for forming the transparent electrodes 114,116.

The first and second mirrors 110 and 112 may be separated by a cavity 130 to define a gap of distance 132 therebetween. The distance 132 represents a dimension of the cavity 130, and may be referred to as a size or height of the cavity 130.

The first and second mirrors 110 and 112 are maintained in spaced apart relation by flexible members, such as a plurality of springs 134, each associated with a respective anchor 136. The springs 134 are connected at a first end to the support element 118 and at a second end to the first mirror 110 such that the first mirror 110 is spaced from the second mirror 112 to define the cavity 130, while permitting movement relative to the second mirror.

The gap dimension 132 is changed or otherwise adjusted between minimum and maximum amounts to adjust the wavelength of light transmitted through the Fabry-Perot filter. For example, first mirror 110 may be deformed to a dimensional change in the cavity 130 by applying a voltage in the range of 5-100 volts across transparent bottom electrode 116 and transparent top electrode 114, or a charge in the range of $10^{-11}$ coulombs on transparent bottom electrode 116 and transparent top electrode 114 to effect a change in the size 132 of cavity 130 of about 300 to 500 nm. Hence, electrodes 114 and 116 may form a capacitor and the Fabry-Perot Fabry-Perot filter 100 may have an associated capacitance. As the size 132 of cavity 130 decreases, for example, the Fabry-Perot transmission peak shifts to shorter wavelengths.

The size 132 may be changed in a variety of ways. For example, the size 132 may be changed in a way in which the first mirror 110 stays stationary, while the second mirror 112 moves relative to the first mirror 110. Alternatively, the size 132 may be changed in a way in which the second mirror 112 stays stationary, while the first mirror 110 moves relative to the second mirror 112. Alternatively, the size 132 may be changed in a way in which both the first mirror 110 and the second mirror 112 are moving relative to each other. In various exemplary embodiments, the first mirror 110 and the second mirror 112 maintain parallel with each other regardless of the relative movement there between.

Furthermore, the size of the cavity 130 may be changed by a mechanism other than application of a voltage. For example, the size of cavity 130 may be changed by a mechanical, thermal or magnetic mechanism.

In the Fabry-Perot filter 100 shown in FIG. 2, light may be received at the top of the Fabry-Perot filter 100 through the top electrode 114. The received light may be transmitted through the cavity 130 and the portion 122 of the substrate 120 at a tuned wavelength.

Figure 4:
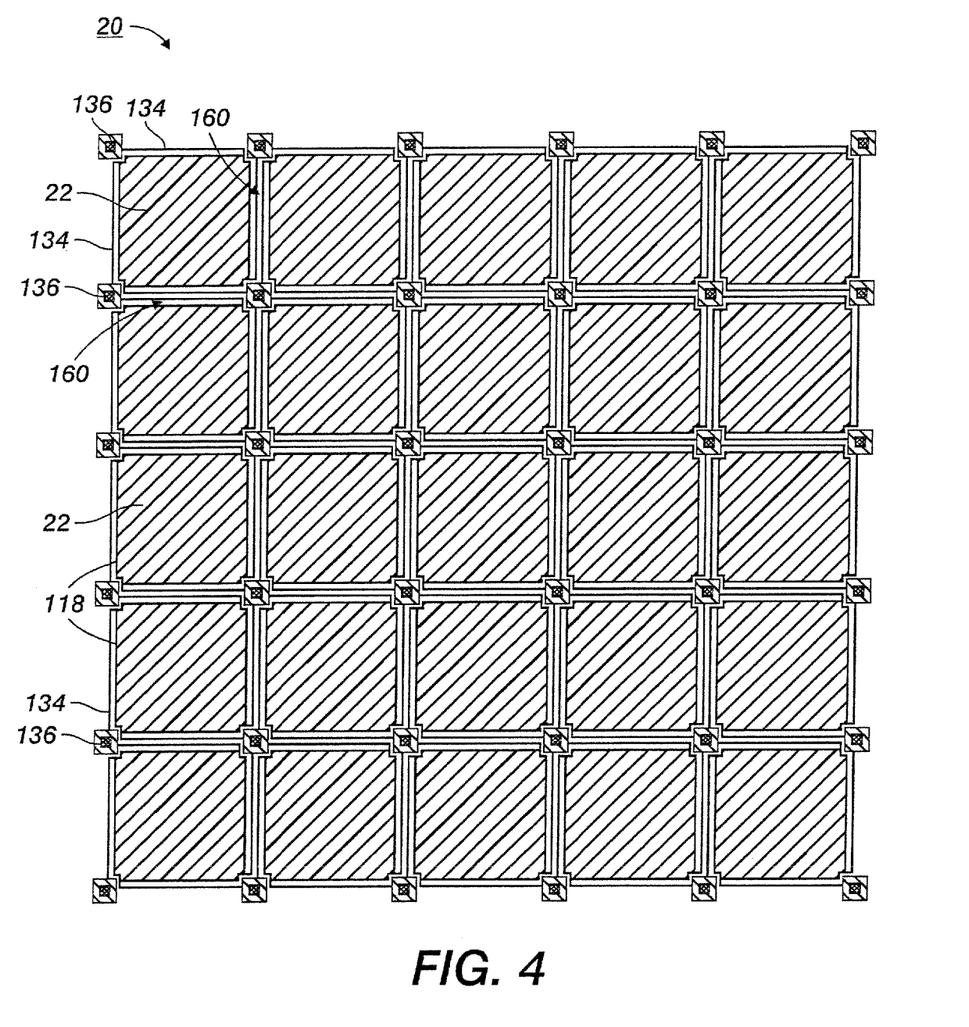
FIG. 4 is a top plan view of a Fabry-Perot array according to a first exemplary embodiment.
Figure 5:
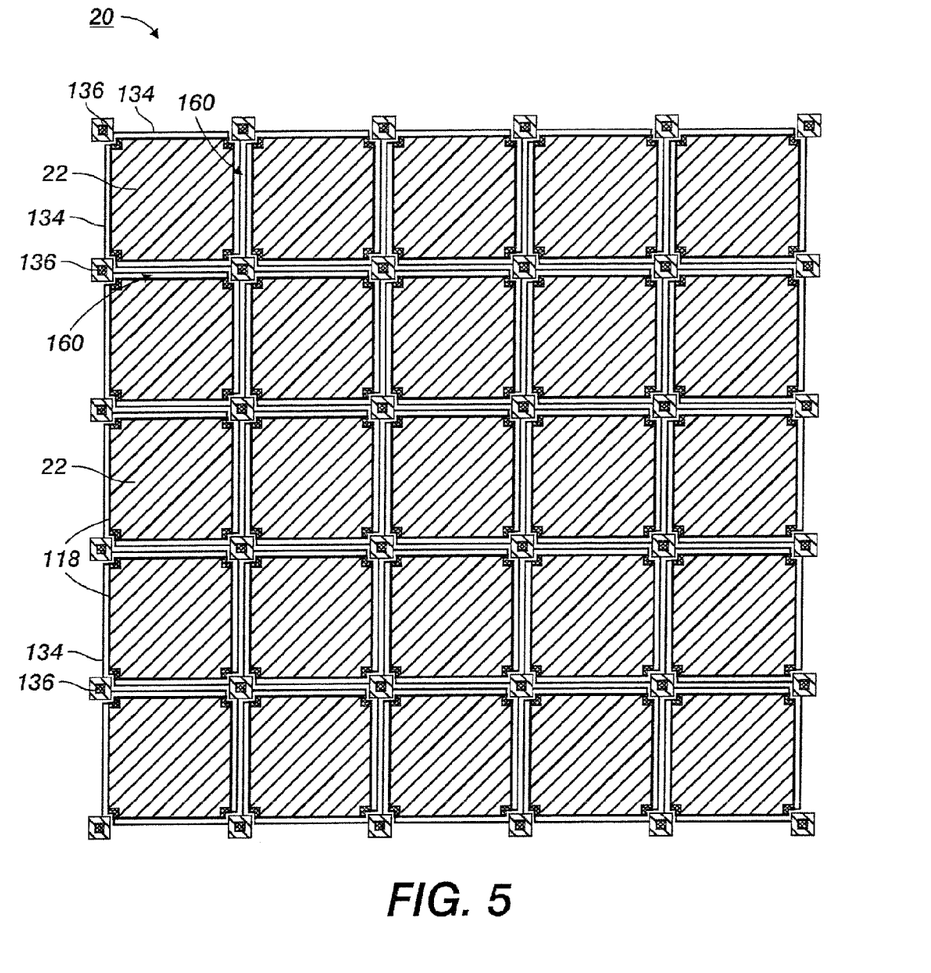
FIG. 5 is a top plan view of a Fabry-Perot array according to a second exemplary embodiment.

The display apparatus 10 may be constructed to avoid or minimize dead spaces between the projected image pixels which result from the spacing between filters 22. One way of achieving this is by situating the Fabry-Perot filters 22 close together with little space between them. FIGS. 4 and 5 show two designs suitable for projection systems. As shown in FIG. 4, the array 20 may include a plurality of adjacently located Fabry-Perot filters 22. For clarity, only the support elements 118, springs 134, and anchors 136 are illustrated in this figure. The mirrors and electrodes are not shown. Although FIG. 4 shows a 5×5 array of cavities 130, it will be appreciated that in practice the array may be much larger and may include at least 600 devices per linear inch (dpi) as an N×M array, where N and M are integers. In some embodiments, the filters 22 may be less than 50 μm in both dimensions of the plane, e.g., 20-25 μm, corresponding to about 1000-1200 dpi.

Figure 6:
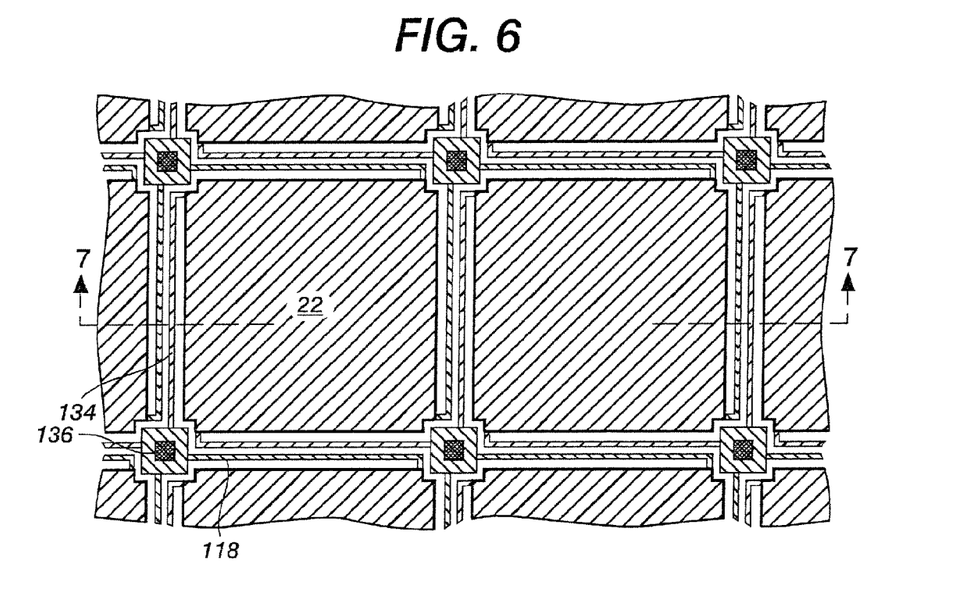
FIG. 6 is an enlarged top plan view of the array of FIG. 4.

In FIG. 4, thin silicon membranes (not shown) which define the first mirrors 110 are attached directly to the silicon springs 134 that allow them to move. The silicon membranes are thin enough to be transparent even at the lower visible wavelengths. In the embodiment of FIG. 5, nitride membranes (not shown) are attached to the silicon frame 118 at the corners. Spaces between the membranes are indicated at 160. An enlarged view of the silicon membrane version of FIG. 4 is shown in FIG. 6 and in cross section in FIG. 7, where Distributed Bragg Reflectors 162, 163 of mirrors 110, 112 are illustrated. Reflector 162 is supported on a silicon membrane 164.

Figure 7:
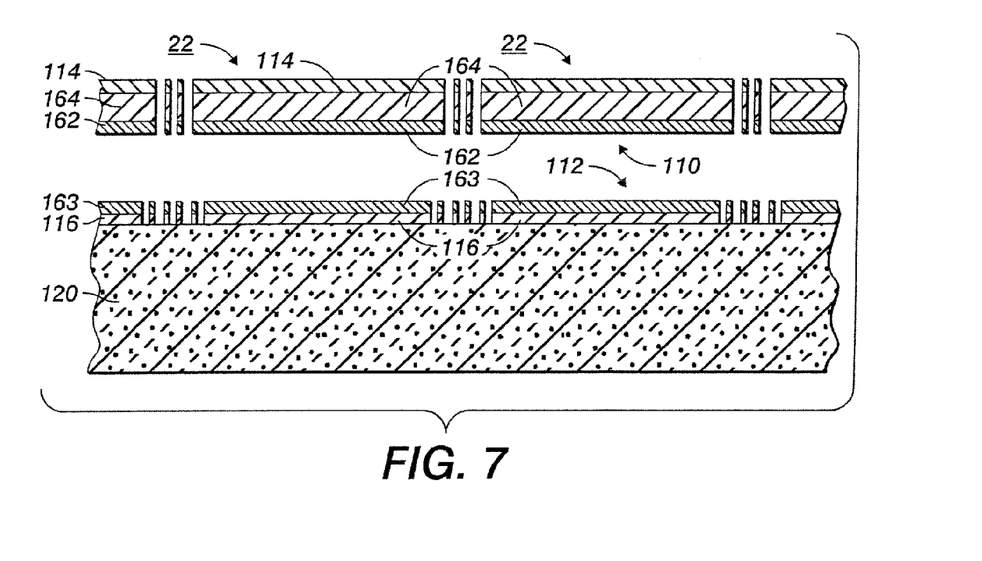
FIG. 7 is a side sectional view of the array of FIG. 6.

The illustrated membrane 164 supports top electrode 114 on its upper surface. Alternatively, the membrane may act as the top electrode. While this has certain advantages in that the two plates of the electrodes are closer together, making the electrostatic attraction stronger, there are advantages in placing the electrode on top of the electrode. Since the mirror layers are very thin, having the membrane act as the second electrode tends to make the electrostatic gap be nearly the same as the optical gap. When an electrostatic device is actuated and the gap between the plates closes to about two thirds of its original value, the electrostatic force overcomes the biasing effect of the springs and causes the plates to snap together. This motion is not controllable, and thus limits the controllable motion to about one third of the total electrostatic gap. Since it is desirable for the optical gap to have a range of from about 350 nm to 200 nm, which is a decrease of more than half, the actuation may not be controllable over this range if the membrane serves as the electrode. By putting the electrode on top, the electrostatic gap is larger than the optical gap, and one third of that larger gap provides the desired range of motion for the optical gap.

The amount of dead space between adjacent membranes is similar for both membrane types, about 3× the minimum space+2× the minimum line width that can be patterned and etched, or about 5-10 μm. In a 600 dpi spacing with a 1 μm minimum line and space 160, that dead space amounts to about 25% of the device area. Since filters 22 could be made as small as 20-25 μm, or 1000-1200 dpi, the dead space 160 may be a much larger percentage of the device area. The effect of this dead space in conventional systems is what's known as the "screen door effect," a dark grid superimposed on the image that is objectionable, particularly when viewed from close up. However, the main benefit of shrinking the device is in lowering of the cost, or increasing the total number of pixels.

Figure 8:
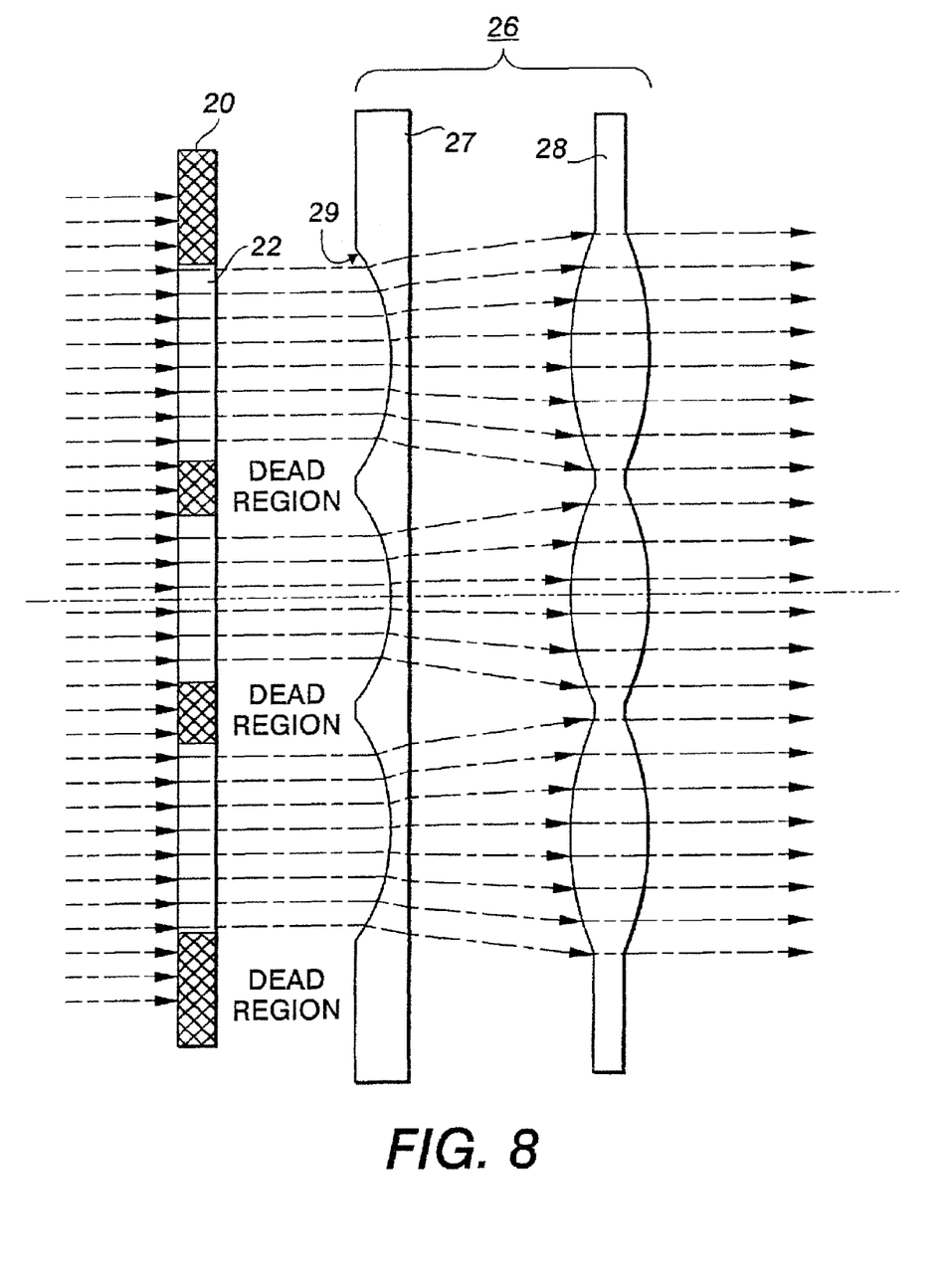
FIG. 8 is an enlarged side view of the display system of FIG. 1.

As illustrated in FIG. 8, the effect can be minimized in the image by attaching a lens array 26 that broadens the light from each pixel so that it fills its allocated space on the projected image.

In alternative embodiments, the filters 22 may also be arranged in other geometrical shapes, such as a triangle, a diamond, a hexagon, a trapezoid, or a parallelogram. The array 20 may be subdivided into blocks, each with a separate substrate, which may form block of cavities 130. A plurality of the blocks may be used in an array to form a larger display system.

In various exemplary embodiments, the filters 22 each may include a silicon membrane attached directly to a silicon spring 134, so that the silicon membrane may move to change the size of the cavity. In various other exemplary embodiments, the filters may include membranes as parallel plates attached to a silicon frame. The filters 20 may be located close to each other without much wasted space in between, so that the amount of "dead space" between adjacent membranes may be reduced or even minimized, and the space used for display may be increased or even maximized.

In one embodiment, the microlenses 29 of lens system 26 serve to converge portions of the image received from adjacent filters 22 to minimize the dead space, as illustrated in FIG. 8.

With reference once more to FIG. 1, the illustrated Fabry-Perot array 20 is controlled by the modulator 15. The modulator 15 may be connected to the Fabry-Perot array 20, and may include a gap control circuit that controls the movement of the mirrors in each cavity. Based on image modulation data, each filter 22 is controlled to have a desired cavity size to allow transmission of a particular wavelength band or collective wavelength band. The particular or collective wavelength band corresponds to the color of a respective image pixel.

The Fabry-Perot filters may also be controlled to provide multiple gray levels (brightness levels) for each color-separated image pixel. For example, the cavity may be controlled through time-division multiplexing of the transmitted light to provide multiple gray levels for each color-separated image pixel. The Fabry-Perot filter is one which can be adjusted such that any electromagnetic radiation which is transmitted is outside the bandwidth of the perceptual limit of human eyes (the "visible range"), generally 400-700 nm. By shifting between a state in which the Fabry-Perot filter transmits in the visible range and one in which any radiation transmitted is outside the visible range, different gray levels can be achieved. A pixel is fully "on" when all pre-selected transmission wavelengths are swept within the visible range. The bandwidth is typically less than 60 milliseconds. The pixel is fully "off" when no light in the visible range is transmitted. Transmission that is between these two limits creates gray-scale levels.

To limit the amount of light contributing to an image pixel, unwanted light may be moved into a non-visible part of the spectrum, such as ultraviolet or infrared. Alternatively, unwanted light may be completely blocked by properly adjusting the size of the cavity. For example, to display a wavelength of light at half brightness, the membrane may spend half of its time set to the gap (size of the cavity) for that wavelength, and the other half at a gap that does not have constructive interference anywhere in the visible spectrum.

In time-division multiplexing, the time resolution of a driving circuitry, such as the modulator 15 or a circuitry used in connection with the modulator, sets a limit to the number of gray levels (brightness levels) possible for a wavelength. For example, if T is the time limit of human eyes perceptual time bandwidth to response to changes in color and i represents the tunable discrete peak wavelengths for the transmission spectra available in the Fabry-Perot tunable filter, then, for a transmission mode display, the gray levels may be represented by the following integral equation:

$$g_i(t) = \frac{\int_0^t \int_{\lambda_{min}}^{\lambda_{max}} S_i(\lambda) d\lambda dt}{g_{i\_100}} \quad (1)$$

where $S_i(\lambda)$ represents the transmission spectra of the Fabry-Perot filter for a discrete peak wavelength setting represented by index i, $\lambda_{min}$ and $\lambda_{max}$ are minimum and maximum wavelengths in the visible range of the light spectra or any suitable range required for integrating the transmission wavelengths, $g_{i\_100}$ represents the maximum gray level for channel index i used to normalize the gray level $g_i(t)$.

When there are N number of gray levels required for the display apparatus (N is typically 256 for a display system) and under time division multiplexing, the total time over which the channel i is left "on" satisfies the following condition:

$$T \leq \sum_{i=1}^{N} T_i \quad (2)$$

Modified versions of Equations (1) and (2) may be used to create multiple gray levels for transmission-type displays. The gray levels for M number of channels may be expressed as:

$$g_i(j) = T_j V_i \text{ for } i=1, 2, 3, \ldots, M \text{ and } j=1, 2, \ldots, N \quad (3)$$

where $V_i$ may be obtained, based on Equation (1), from:

$$V_i = \frac{\int_{\lambda_{min}}^{\lambda_{max}} S_i(\lambda) d\lambda}{g_{i\_100}} \quad (4)$$

Equations (3) and (4) provide gray levels for the display apparatus.

As shown in FIG. 1, light from the source 16 passes through the Fabry-Perot array 20. Modulated light is produced by the Fabry-Perot array and is directed onto the screen for viewing. The modulated light may include an image. Each pixel of the modulated image corresponds to one (or more) filters 22 in the array 20. The color of the pixel is controlled by the size 132 of the cavity. The brightness of the pixel is controlled by time-division multiplexing of the cavity. Thus, an array of cavities 130 may correspond to an array of pixels, and thus may correspond to an image having the array of pixels. However, it is to be appreciated that two or more filters 22 may correspond to a pixel of the image.

The image data modulator 30 converts the image data received from the image source into modulation data for generating an image. The image data may include color values, such as L*a*b* values or RGB values for each pixel of an image. The modulation data may include control signals for changing voltages applied to the electrodes of a filter which result in a cavity distance 132 that provides a desired wavelength band for rendering alone or in combination the desired color values, and time division signals for controlling the proportion of the time that a filter 22 spends outside the visible range for achieving selected brightness values. The wavelength modulator 32 provides control signals to control the size of a cavity at a particular time. The brightness modulator 34 provides control signals to control the time-division multiplexing of a filter 22. The generated modulated image may be temporarily stored in memory 36 prior to being displayed by the Fabry-Perot display apparatus 10.

The modulated image may be one of a series of images modulated from the white light passing through the array 20. The series of images may be animated, such as in a video or a movie. The series of images may also represent stationary images, such as a viewgraph or a page of textual content.

In particular, when the light passes through the array 20, enough color sweeps may be obtained from the array in a spectral space that cover a range of colors required for the pixels by corresponding adjustment of the Fabry-Perot cavity size using modulating data from the wavelength modulator 32. The color sweeps may be carried out at a high frequency, such as 20 Hz (twenty complete cycles from one bandwidth to the other and back again) or greater, so that human eyes are not able to distinguish between filtered color coming out of the discrete gap setting. In one embodiment the filter is shifted between bandwidths at a frequency of 60 Hz or greater (equivalent to about 15-20 ms). Thus, the display apparatus 10 may display color images in various wavelengths by transmitting selectively very narrow wavelengths or collectively a group of wavelengths for each image pixel. Similarly, for time division multiplexing, the brightness modulator 34 may shift between bandwidths, only in this case the second bandwidth is outside the visible range.

In FIG. 4, the Fabry-Perot array may include a two-dimensional array of thin membranes and may be a matrix addressable as a group, or independently, depending on the application. In the matrix addressable as a group, more than one Fabry-Perot cavity will be actuated together to transmit the same wavelengths. Addressing a group or single cavity independently allows different wavelengths to pass through the filter at the same time. The actuation of the addressing may be performed by the modulator 15, by modulating the voltage signals provided to drive the cavities 130.

Figure 9:
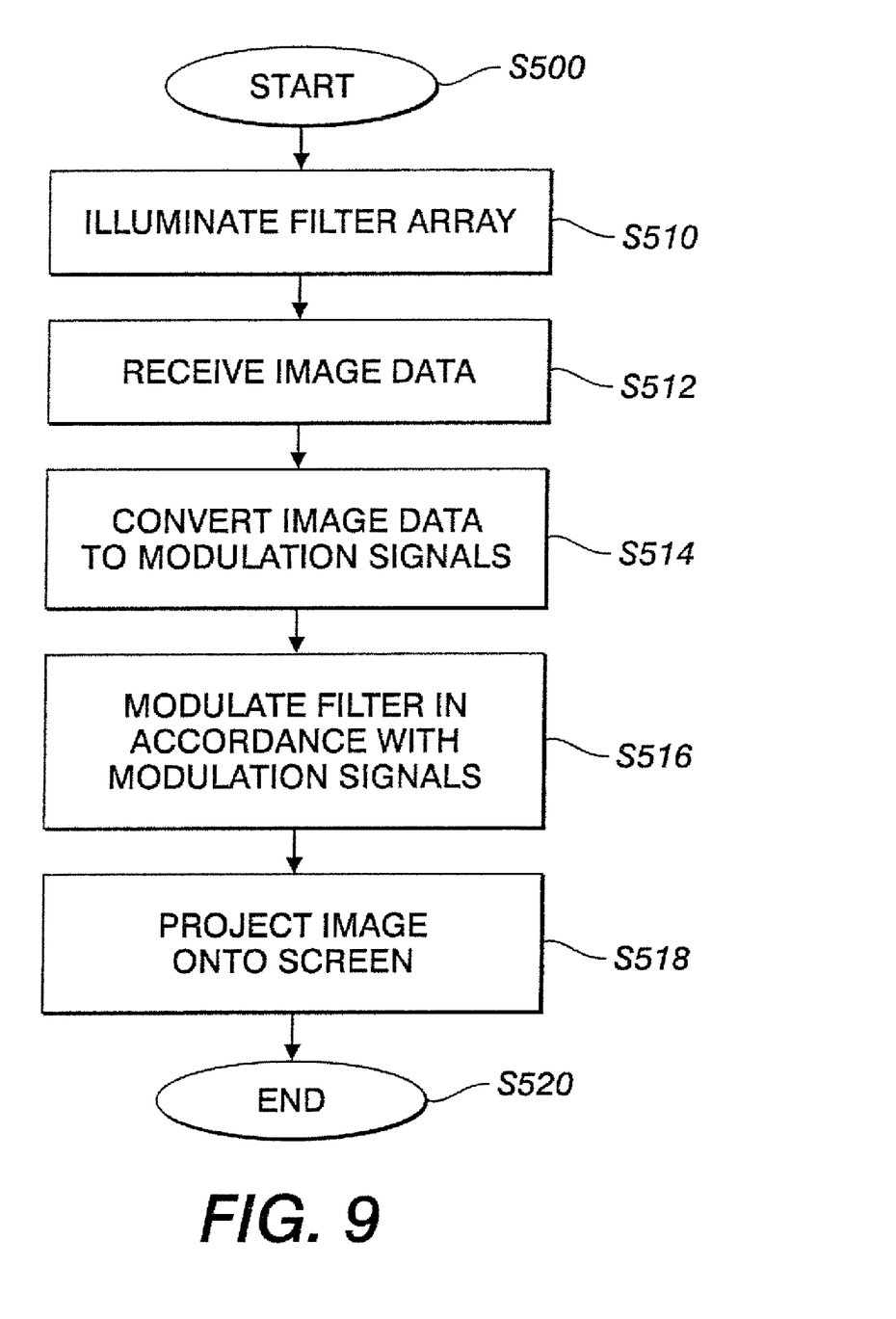
FIG. 9 illustrates steps of an exemplary method of projecting an image.

FIG. 9 outlines an exemplary process for controlling a display apparatus. It is understood that the order of steps need not necessarily be as shown in FIG. 9 and that one or more of the steps in FIG. 9 may be omitted or that different steps may be provided. As shown in FIG. 9, the process starts at step S500 and proceeds to step S510, where light from an illuminator is received at the display apparatus 10. Next, at step S512, image data is received. At step S514, the data is converted to modulation signals which include wavelength information and brightness information. At step S516 an array of the display apparatus is controlled to generate an array of respective pixels of an image based on the modulation signals. Then, in step S518, the generated image is displayed on the screen. The process ends at step S520.

The method illustrated in FIG. 9 may be implemented in a computer program product that may be executed on a computer. The computer program product may be a computer-readable recording medium on which a control program is recorded, or may be a transmittable carrier wave in which the control program is embodied as a data signal.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of projecting an image comprising:
receiving image data for an image to be projected;
illuminating a plurality of tunable Fabry-Perot filters, each of the filters being configured for shifting between a state in which the filter transmits radiation in a bandwidth in the visible range of the electromagnetic spectrum and a state in which the filter transmits radiation in a bandwidth outside the visible range of the electromagnetic spectrum;
controlling the tunable Fabry-Perot filters to project the image onto an associated display surface including providing wavelength modulation signals to the plurality of Fabry-Perot filters to modulate a color of pixels in the image and causing selected ones of the Fabry-Perot filters to shift into the bandwidth outside the visible range to modulate the brightness of pixels in the image in accordance with the image data.

2. The method of claim 1, further comprising magnifying the projected image with a projection lens system.

3. The method of claim 1, wherein the causing of selected ones of the Fabry-Perot filters to shift between a bandwidth in the visible range and a bandwidth outside the visible range is at a frequency at which the two bandwidths are not separately detectable by the eye.

4. The method of claim 1, wherein the frequency is at least 20 Hz.

5. The method of claim 1, wherein causing of selected ones of the Fabry-Perot filters to shift between bandwidths includes time-division multiplexing.

6. The method of claim 1, wherein each of the Fabry-Perot filters is capable of selectively transmitting radiation in any one of a plurality of bandwidths in the visible range of the electromagnetic spectrum.

7. The method of claim 1, wherein the each of the Fabry-Perot filters comprises a pair of mirrors, and the method includes adjusting a distance between the pair of mirrors based on the image data.

8. The method of claim 1, further comprising supporting the mirrors on a transparent substrate.

9. The method of claim 1, wherein the filters are arranged in an array.

10. The method of claim 1, wherein each of the Fabry-Perot filters is individually addressable.

11. The method of claim 1, wherein the causing of causing of selected ones of the Fabry-Perot filters to shift into the bandwidth outside the visible range includes causing selected ones of the Fabry-Perot filters to shift between a bandwidth in the visible range and a bandwidth outside the visible range at a frequency of at least 20 Hz.

12. The method of claim 1, wherein the frequency is at least 60 Hz.

13. The method of claim 1, further comprising diverging the image with a lens array comprising a plurality of microlenses.

14. A computer program product comprising a computer-readable recording medium on which a control program is recorded including computer-executable instructions for performing the method of claim 1.

15. A projection method comprising:
providing an image source which supplies image data for an image to be projected;
providing an array of individually tunable Fabry-Perot filters mounted on a common transparent substrate, each of the filters being configured for transmitting visible light therethrough;
illuminating the plurality of Fabry-Perot filters with light;
controlling projection of an image onto an associated display surface, the controlling comprising providing wavelength modulation signals to the array of Fabry-Perot filters to modulate a color of pixels in the image; and
diverging the image with a lens system which includes an array of microlenses intermediate the array of filters and the associated display surface.

* * * * *